(No Model.) 2 Sheets—Sheet 1.
J. M. ORAM.
METHOD OF AND APPARATUS FOR PROTECTING ELECTRIC CIRCUITS.
No. 537,932. Patented Apr. 23, 1895.
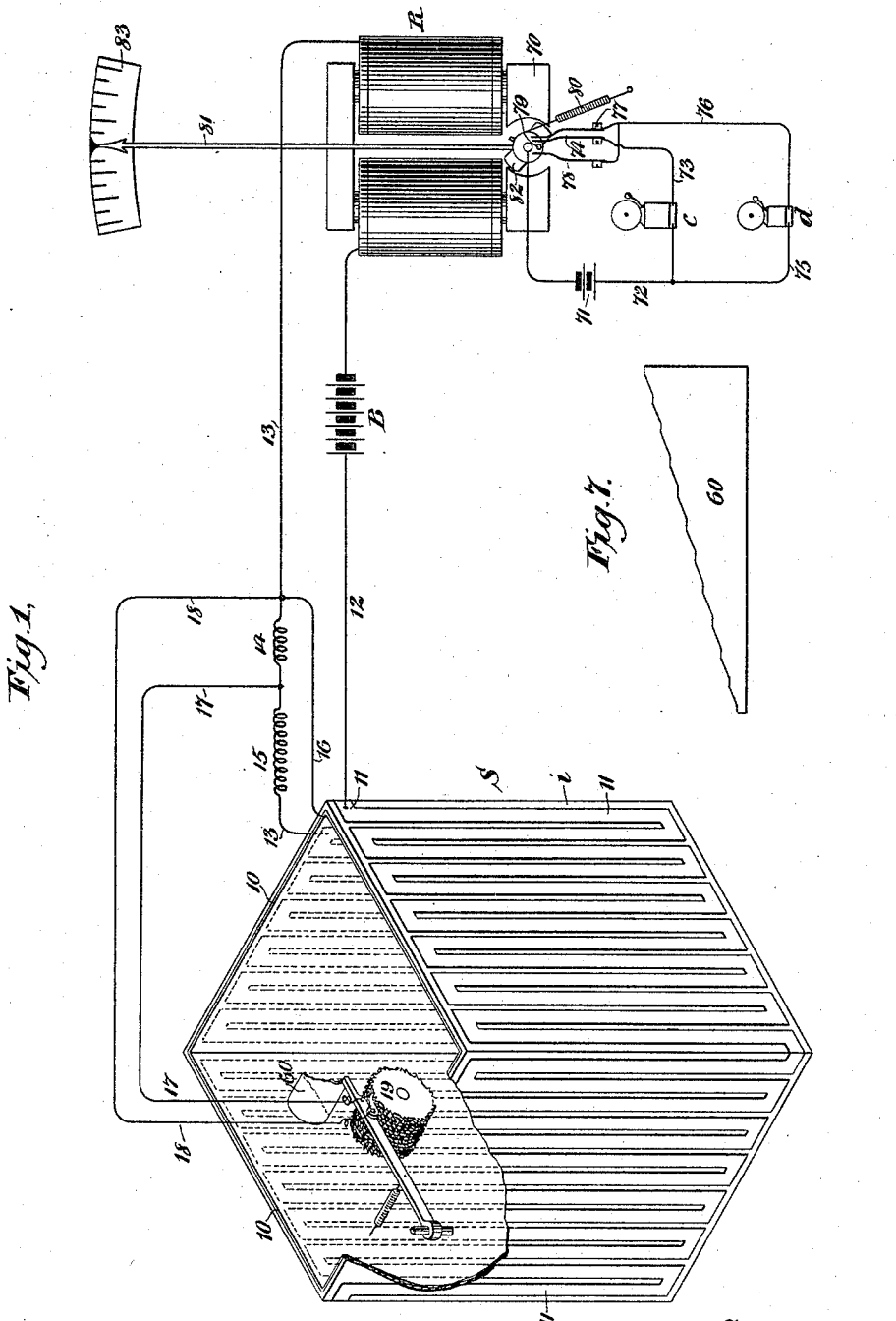

(No Model.) 2 Sheets—Sheet 2.
J. M. ORAM.
METHOD OF AND APPARATUS FOR PROTECTING ELECTRIC CIRCUITS.
No. 537,932. Patented Apr. 23, 1895.
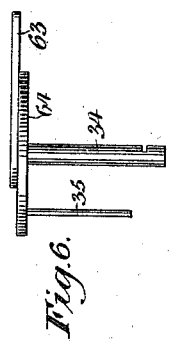
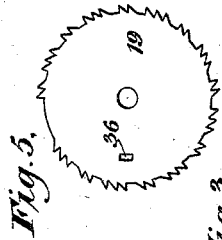
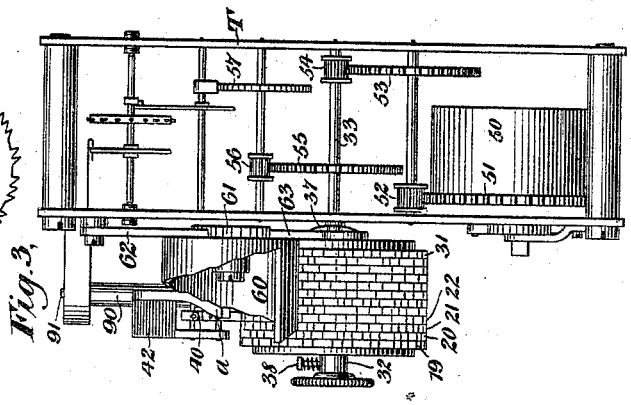

UNITED STATES PATENT OFFICE.

JOHN M. ORAM, OF DALLAS, TEXAS.

METHOD OF AND APPARATUS FOR PROTECTING ELECTRIC CIRCUITS.

SPECIFICATION forming part of Letters Patent No. 537,932, dated April 23, 1895.

Application filed January 15, 1895. Serial No. 534,955. (No model.)

*To all whom it may concern:*

Be it known that I, JOHN M. ORAM, a citizen of the United States, residing at Dallas, in the county of Dallas and State of Texas, have made certain new and useful Improvements in Methods of and Apparatus for Protecting Electric Circuits, of which the following is a specification.

The object of my invention is to protect or guard electric circuits, such as burglar-alarm circuits, from interference by unauthorized or mischievous agency.

In describing and illustrating my invention I have employed the well known arrangement of circuits described in expired United States Letters Patent No. 110,362, dated December 20, 1870, where there is shown a sheet of metal-foil surrounding the protected structure, as a safe; a strip of foil, arranged in convolutions upon the surface of the surrounding sheet of foil, but insulated from said sheet, is included in series in circuit with a battery and electromagnetic indicating instrument. There is an artificial resistance in the circuit in series with this convoluted strip of foil, and the first named sheet of foil is connected to the electric circuit upon the side of the artificial resistance opposite to that in which the said strip in included. It results from this that if the protected structure, the safe, is attacked, the convoluted strip will either be broken or brought into electrical contact with the metal foil sheet thus either opening the circuit or operating to short-circuit the artificial resistance. Such breaking of the circuit causes a galvanometer to sound an alarm, while the described short-circuit of the artificial resistance produces an increased strength of current to which the galvanometer responds by sounding an alarm.

While the above described is as complete and satisfactory an arrangement of a circuit for the purpose as has so far been devised, it has been found possible to render it inoperative. A skillful man may determine the electro-motive-force of the battery employed and the amount of the artificial resistance, and having done this he may substitute a new battery, and a new artificial resistance, located at any desired distance from the protected premises, and may substitute the one for the other and disconnect the protected premises from the circuit without attracting attention.

My invention involves a method of continuously and automatically operating the circuit arranged as above described so that any interference will be immediately apparent upon an indicator or alarm arranged for the purpose; that is to say, I modify or vary the current normally flowing in the protected circuit in accordance with a prearranged and predetermined plan or pattern, and I change this plan or pattern at stated periods in an arbitrary and predetermined manner, known only to the authorized attendant, having lawful control of the protected premises and circuit. For instance, I cause an automatic transmitter to be continuously operated by a clock movement. The transmitter operates to vary the current without breaking it, and for the first period, say the first hour, sends the signal consisting of three impulses or variations, followed by a pause, succeeded by two impulses or variations. This signal "32" is repeated at intervals of five minutes. Then during the next or second hour a different simple or compound signal is repeated at intervals of five minutes and so on, a predetermined change being made at the end of each period, as an hour, during the whole period of twelve or more hours, during which the protected premises is under the care of the watchman and protecting circuit.

It is obvious that other predetermined and arbitrary changes in the automatic transmission of the signal might be made both in regard to the character of the signal and the period of time during which any signal should be continued. For instance, the change might be made at half-hour intervals on one day, and at intervals of one hour the succeeding day; and the periods of time might be made to commence upon the even hour one day and upon any predetermined division of the hour the next day; the general idea being to continuously and automatically inflect or vary the current flowing in the protected circuit in an arbitrary or predetermined manner both as regards the period of time, the duration and the initiation thereof as well as the character of the signal. The apparatus employed by me for this purpose consists of a series of wheels, in number equal to the number of changes in the character of the signal desired to be produced. These wheels have their periphery divided into a characteristic arrangement of notches and serve to make and break a short-circuit around an artificial, sectional resistance, located in the protected circuit. If the premises are to be protected twelve hours I may provide twelve wheels which I arrange side by side upon an arbor, which is rotated one complete rotation each hour or period during which any one signal is to be repeated. At the end of each hour or period the circuit-breaking device is changed from one wheel to another, automatically, and the operation is continued indefinitely or as long as desired. The circuit-breaker referred to operates in a short circuit to cut in and out an artificial resistance, but any arrangement of circuit-changer operated to change or vary the normal current in the protected circuit, either by varying the electro-motive-force, or the strength of current, or the polarity thereof, may be employed. I prefer to locate the variable signal transmitter inside the protected structure, as the safe or vault.

The accompanying drawings illustrate my invention.

Figure 1 is a schematic view of the arrangement of circuit and apparatus. Fig. 2 is a front elevation of the automatic, variable signal transmitter or clock. Fig. 3 is a view from the right hand end of Fig. 2. Fig. 4 is a top view. Fig. 5 is a view of one wheel of the transmitter. Fig. 6 is a view of the device upon which the signal wheels are placed, affording means for changing their relative positions to vary the transmitted signal. Fig. 7 is a produced surface of the shifting or adjusting device for automatically changing the transmitted signal at a predetermined point.

S contains a safe or protected structure, which may be of any size or character. It is surrounded with a sheet of metal foil 10, upon which is placed an insulating material or sheet $i$, and upon this sheet is a strip of metal-foil 11 arranged in closely disposed convolutions over the entire surface to be protected. At the station where is located the watchman or guard, there is an electro-magnetic receiving instrument R responsive to three variations in current, including one decrease of current or no current, and two separate increases in current strength. The magnet has pole pieces like 70, and an armature 82, influenced by the retracting spring 80. The armature carries a metal disk and conducting pin 79. There is a local circuit having a battery 71. One terminal of the circuit is connected to the pin 79. A second terminal of the local circuit, containing the indicating device $c$, terminates in a flexible spring contact 74. A branch of the local circuit, including indicating device $d$, terminates in two contacts 77 and 78. The point 79 is shown in its normal position. The lesser of two increases in current strength causes the point 79 to contact with 74 closing the circuit of 71 through $c$. The greater increase of current causes the point 79 to contact with points 74 and 77, and both branches of the local circuit are closed with the battery 71. If the current be entirely broken, spring 80 carries the point 79 in the opposite direction, making contact with 78, closing the local circuit through the indicating device $d$.

B is a main line battery.

12, 13, is the main circuit including the electro-magnet R at one station, and the protected structure at the other station. At the protected station there are two artificial resistances, 14 and 15, the latter being about twice the resistance of the former. The convoluted strip 11 is included in this circuit in series-circuit normally passing from the positive pole of B, via conductor 12, strip of foil 11, to conductor 13, resistance 15, resistance 14, wire 13, electro-magnet R, to the battery. It will be noticed that one terminal of the sectional resistance 15, 14, is directly connected to the strip of foil 11, and a conductor 16 connects the opposite terminal of said resistance with the continuous sheet of foil 10. From this arrangement of circuit it results that if the strip 11 be broken, the main circuit will be broken, and that if electric connection be made in any way between the strip of foil 11 and sheet 10, the entire resistance will be short circuited.

Within the protected structure S, I place a circuit closer operated by a clock, or train of wheels, in regular continuous movement. For the purpose of operating the circuit closer I provide a variable plan or pattern, consisting of a series of notched disks or wheels. The latter constitutes an automatic variable signal transmitter, the circuit closer controlled by which operates to short circuit the resistance 14 at intervals determined by the arrangement of the plan or pattern, consisting of the notched disks or wheels. This plan or pattern is capable of many variations. I have invented an automatic variable transmitter or clock of the character described, which I prefer to employ because of its simplicity, its certainty of operation, and its durability. This transmitter or clock is shown in Figs. 2 to 7 inclusive.

T is the clock. It has a series of wheels, 51, 52, 53, 54, 55, 56, 57, propelled by a spring in the box 50. 33 is an arbor connected with this train, arranged to complete one rotation each hour. The arbor 33 projects through the side plate of T.

In Fig. 6, 34 is a hollow spindle nicely fitting the projecting end of the arbor 33. It is provided with a notch engaging a pin upon 33. To the spindle 34 is connected a disk 64, and an arm 63. To 64 is fixed a pin 35 parallel with spindle 34.

In Fig. 5, 19 is one of a series of twelve wheels. Each wheel has its periphery divided into a characteristic succession of notches and spaces. For simplicity I have shown wheel 19 arranged to transmit the signal "32" with suitable spaces between successive signals.

The wheels 19 are centered upon the hollow spindle 34, and the pin 35 enters the holes 36 and locks the wheels against independent rotation. The spindle 34 is placed upon the arbor 33, and the spring 37, attached to the arbor 33, exerts such a pressure upon the wheels 19 that they are caused to revolve with it.

$a$ is an arm connected with the vertical support 90, the latter having bearings 91, 92. The free end of arm $a$ has a movement in a plane at right angles to the vertical surface of the clock or transmitter T. The spring 45 tends to draw the free end of the arm $a$ toward the transmitter. Upon the end of the arm $a$ are two contact points, 40 and 41, pivoted in the support 42. Point 40 is insulated from 41 and is electrically connected by the conductor 44 with the conductor 18.

61 is a pinion.

63 is an arm upon the hollow spindle 34 and engages with pinion 61.

62 is a holding pawl engaging with pinion 61. Upon the arbor with 61 is the shifting or adjusting device 60. This consists of a cylinder, the end of which is regularly notched, as shown in the produced surface, Fig. 7. The free end of arm $a$ normally rests against the notched end or edge of the cylinder 60, as shown in Fig. 4. As the cylinder 60 is advanced, the end of the arm $a$, under the influence of spring 45, moves from one wheel or disk 19 to another. The cylinder 60 is advanced one-twelfth of its revolution by the arm 63 engaging with the teeth of pinion 61. This occurs once each complete revolution of the arm 63. It results from this that the circuit closer 41, which engages the teeth upon the periphery of wheel 19, is changed from one wheel to the next once each hour, or whatever period or time of change may be determined upon.

The operation of the above described apparatus is as follows, assuming the normal condition of the circuit and receiving instrument, as shown in Fig. 1, and the wheels 19, twelve in number, arranged to change the signal at the end of each hour; as the teeth of wheel 19 pass under the end of the contact 41, a short circuit is formed around the resistance 14, via 17, 43, 40, 41, 44, and 18. Upon each closing of this short circuit, the current strength in circuit 13 is increased. The armature of electro-magnet R is rotated against the influence of spring 80. The pin 79 engages with the spring contact 74, closing the local circuit of battery 71 via 72, $c$, 73, 74, 79, to the battery. The first wheel 19 is arranged to send the compound signal "32" twelve times, initiating the transmission at the beginning of each five minute interval. At the end of the first hour the arm 63 engages the pinion 61, and the cylinder 60 is advanced one step. The end of the arm $a$ under the influence of spring 45 is drawn along the space of the thickness of a wheel 19, into position to engage the periphery of the second wheel 19, which let us assume, is provided with teeth arranged to transmit the signal "12." This signal is transmitted at five minute intervals for the second hour, at the end of which period the same change is made, in the same manner, to a third wheel, and the characteristic signal of this wheel is transmitted during the third hour, and so on until the end of the twelfth hour, when the premises are assumed to be transferred to the charge of authorized agents.

I have, in describing my invention, selected uniform signals for each wheel, and uniform changes as regards the period of time. I desire it to be understood, however, that I may so arrange the apparatus as to produce various and arbitrary signals for each period of time, and that I may vary the intervals at which such changes shall occur in an arbitrary and irregular manner.

Any unauthorized interference with the protected structure resulting in a mutilation of the signal or a change in the predetermined character thereof, will be immediately noticed by the attendant at the watchman's station. If violence is used in an attempt to obtain access, the convoluted strip of foil will be broken, which will result in breaking the electric circuit, and the armature of magnet R, under the influence of spring 80, will bring pin 79 into contact with the spring 78, closing the local circuit of battery 71, via 72, 75, $d$, 76, 78, 79, and $d$ will respond. If the contact point consisting of the strip 11, and the foil sheet 10, are electrically united in any way, the entire resistance will be short circuited through the branch conductor 16, and the increased strength of current will increase the magnetic strength of the magnet R, whose armature will carry the point 79 against springs 74 and 77; 74 being deflected, and circuit will be closed through the indicating device $d$, as described.

What I claim, and desire to secure by Letters Patent, is—

1. The herein described method of guarding an electric circuit which consists in varying the normal current continuously and automatically, according to a plan or pattern, changing the character, nature or arrangement of said plan or pattern at predetermined intervals, and reproducing such arbitrary variations upon an indicating instrument at a distant point, in accordance with an arbitrary, cooperative plan of action known only to the receiving station, and causing the alarm signal to be given or depend upon the cessation of or variation from such arbitrary cooperative plan substantially as described.

2. The herein described method of guarding an electric circuit which consists in automatically varying the current flowing in said circuit at predetermined intervals, according to a set plan or pattern, changing the nature or arrangement of said pattern and the intervals of variation thereof in a predetermined manner reproducing such arbitrary variations upon an indicating instrument at a distant point, in accordance with an arbitrary, cooperative plan of action, known only to the receiving operator, and causing the alarm signal to be given or depend upon the cessation of or variation from such arbitrary cooperative plan, substantially as described.

3. The combination in an electric burglar-alarm of an electro-magnetic receiving instrument, an electric circuit including a main battery, an artificial resistance, a circuit closer having contact points electrically connected to said circuit upon opposite sides of said resistance, and an automatic continuously operating variable signal transmitter connected to said circuit upon opposite sides of said resistance, all arranged and operating substantially as described.

4. The combination in an electric burglar-alarm of an electro-magnetic receiving instrument, an electric circuit therefor containing a main battery, a fragile strip or section of conductor disposed upon the protected structure, included in said circuit in series, an artificial resistance in said circuit, contact points arranged in proximity and connected with said electric circuit upon opposite sides of said resistance, and an automatic continuously operating variable signal transmitter located at the protected premises, all arranged and operating substantially as described.

5. The combination in an electric burglar-alarm of an electro-magnetic receiving instrument, an electric circuit therefor containing a main battery, a fragile strip or section of conductor disposed upon the protected structure, included in said circuit in series, an artificial resistance in said circuit, contact points arranged in proximity and connected with said electric circuit upon opposite sides of said resistance, and an automatic transmitter connected to said circuit upon opposite sides of a section of said resistance, all operating substantially as described.

6. The combination in an electric burglar-alarm of an electric circuit including a main battery, an artificial resistance, a circuit closer having contact points electrically connected to said circuit closer upon opposite sides of said resistance, an automatic, variable signal transmitter, connected to said circuit upon opposite sides of said resistance, and an electro-magnetic receiving instrument responsive to two or more variations in current, a local circuit therefor, indicating instruments in the local circuit, and contact points in the local circuit controlled by the main line receiving instrument, substantially as described.

7. The combination in an automatic signal transmitter of a series of disks or wheels arranged side by side, each wheel having a characteristic periphery, a pivoted arm, a retractor therefor, a controlling device for said pivoted arm, consisting of a graduated path or surface, with which the free end of the arm engages under the influence of said retractor, a motor driven train of wheels for imparting continuous rotation to the first named disks or wheels, a mechanical connection between said train and said controlling device, whereby the latter is changed periodically, a circuit closer carried by the movable arm, in position to engage with the signal wheels, and electrical connections, substantially as described.

8. In an automatic variable signal transmitter the combination of a movable carrier, a shifting or adjusting device controlling the movement of said carrier, a circuit closing device located upon the carrier; a series of points or projections forming a plan or pattern for actuating said circuit closer, means for arbitrarily changing the plan or pattern, and a continuously operating motor connected to said shifting device and to said plan or pattern, substantially as described.

9. In an automatic, variable signal transmitter, the combination of a movable carrier, a shifting or adjusting device, consisting of a cylinder having a graduated edge, in contact with which said carrier moves, a circuit closer located upon the carrier, a series of disks, each having a characteristic arrangement of notches or projections in its periphery in position to engage with said circuit closer, a spindle for mounting said disks in any predetermined succession, a motor driven train to which said spindle is connected and electrical connections, substantially as described.

10. The combination in an automatic variable signal transmitter, of a series of disks or wheels arranged side by side, each wheel having a characteristic arrangement of notches in its periphery, a circuit closing point moving in an axial direction across said disks or wheels, an electric circuit including said movable circuit closing point, a shifting or controlling device for moving said circuit closing point and a motor driven train of wheels connected with said wheels and with said shifting or controlling device, substantially as described.

JOHN M. ORAM.

Witnesses:
ED. T. MOORE,
JOHN FROST.